Figure 1:
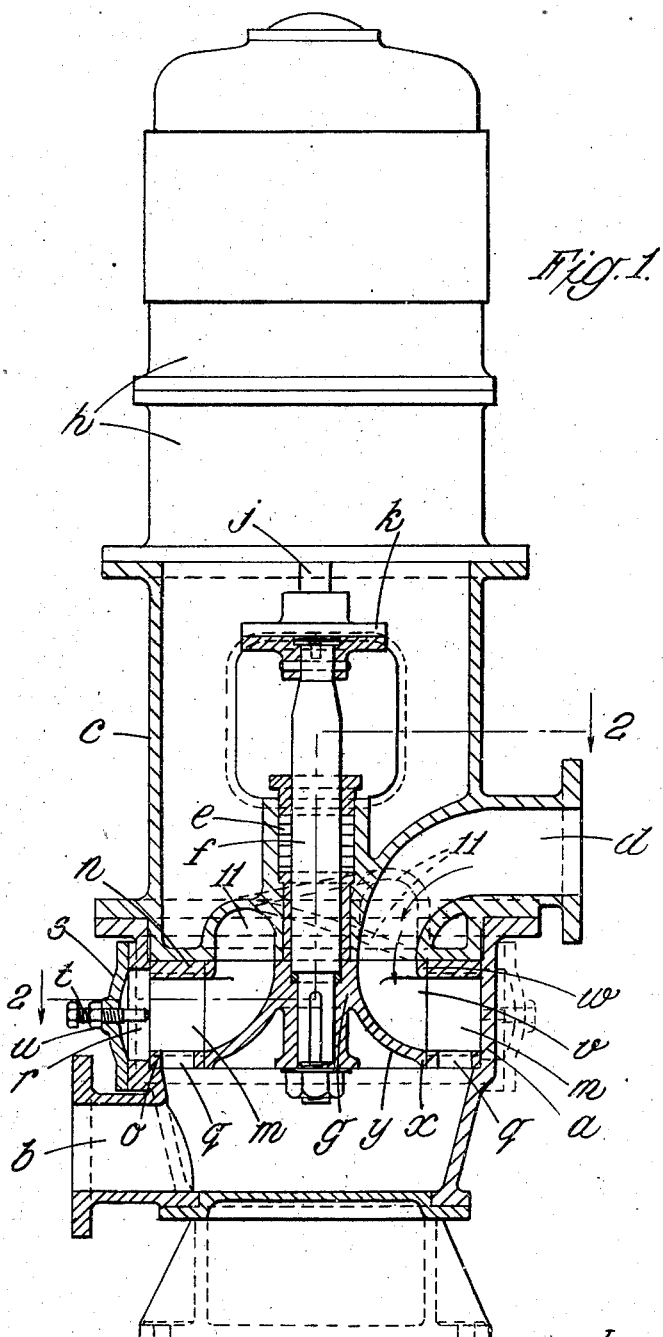

Patented Feb. 13, 1945

2,369,312

UNITED STATES PATENT OFFICE 2,369,312

DISINTEGRATOR FOR SEWAGE SLUDGE AND FOR LIKE PURPOSES

William King Porteous, St. Margaret's, Twickenham, England

Application July 21, 1942, Serial No. 451,727
In Great Britain August 13, 1941

7 Claims. (Cl. 241—90)

Disintegrators for sewage sludge are known in which the cutting edges of relatively fixed and movable blades lie on the surface of a cone or are presented at the ends of apertures situated in concentric circles in superposed discs. In both such arrangements different parts of the cutting edges are at different radial distances and, in consequence, those parts which are situated at the greater radial distances move with a higher velocity than those parts which are situated at the smaller radial distances and, as a result, undergo greater wear, so that it becomes impossible to adjust the blades to obtain uniform action at all parts thereof. The primary object of the present invention is to obtain such uniform action, for which purpose a disintegrator for sewage sludge and for like purposes made in accordance with this invention comprises a rotary cutter with a plurality of helical blades the cutting edges of which are situated at the surface of a cylinder, the helices being arranged to produce an axial and outward movement of the sludge or other matter to be treated, and a plurality of straight fixed blades spaced from one another in a circular series and the cutting edges of which are situated substantially at the surface of the same cylinder.

Preferably the fixed blades lie in radial or substantially radial planes and may be adjustable in the radial direction and preferably also the blades of the rotary cutter are symmetrically arranged about its axis for the purpose of balance and to prevent wear, and the pitch of the helices should be such that each helical blade overlaps a plurality of the straight fixed blades.

Both the rotary and fixed blades should be as hard as possible and it is desirable that the fixed blades should be backed away at their cutting edges for clearance purposes, whilst if desired the blades of the rotary cutter may also be backed away.

Although it is not essential, it is preferable that the rotary cutter should have an overhead drive and that the sludge should have imparted thereto a downward and outward movement. For example, the rotary cutter may be driven by an overhead electric motor through speed reduction gearing so that a very large number of cuts are made at a slow speed, with the result that undue wear will not occur, whilst, inasmuch as the cutting takes place at the surface of a cylinder, the peripheral speeds of all points on the blades is the same, and consequently wear is substantially uniform.

In order the more effectually to feed the sludge or the like to the rotary cutter, the admission thereof may be by way of an open bottomed helical passage the entrance to which is at the maximum depth thereof so that as the sludge or the like moves in said passage it is forced gradually between the helical blades of the rotary cutter; further, in order to set up a preliminary disintegrating action, a fixed blade may be arranged in a substantially radial plane, above the rotary cutter, at or about that part of the helical passage which is of minimum depth, so as to co-operate with the tops of the blades of said rotary cutter.

Figure 2:
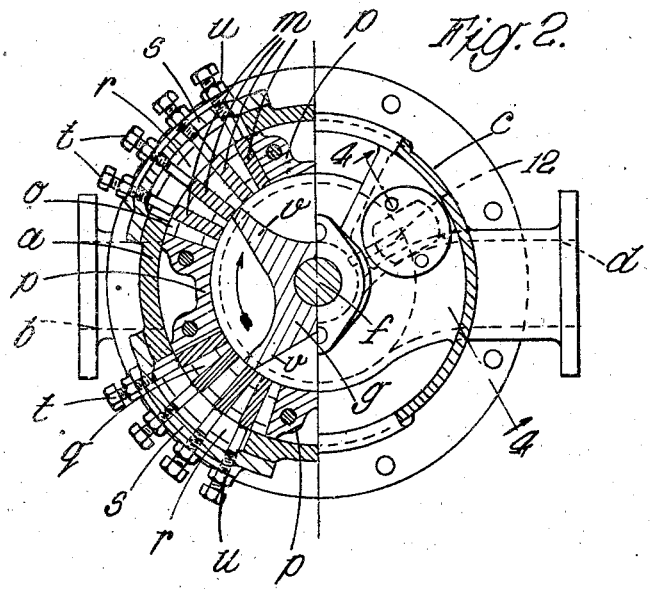
Figure 3:
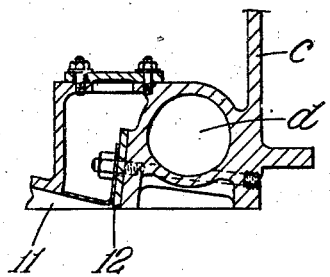
Figure 4:
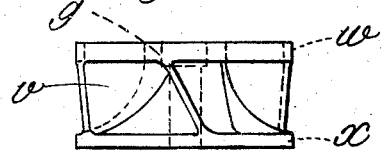

One form of disintegrator constructed in accordance with this invention is shown in the accompanying drawings of which Figure 1 is a central sectional side elevation; Figure 2 is a sectional plan on the line 2—2, Figure 1; Figure 3 is a detail section on the line 4—4, Figure 2; Figure 4 is a side elevation of the rotary cutter.

As illustrated, a body of generally cylindrical shape is built up from three suitable connected sections, a base section $a$ closed at the bottom and having a lateral outlet $b$, a central section $c$ having a lateral inlet $d$ and carrying a bearing $e$ for a driving shaft $f$ arranged axially therein, said shaft $f$ carrying at its lower part a rotary cutter $g$ as described hereinafter, and an upper section $h$ in which is arranged a combined electric motor and reduction gear box, the shaft $j$ of which is coupled at $k$ with the shaft $f$ in order that the latter may be driven at slow speed.

Within the upper part of the base section $a$ of the body is disposed an annular carrier for the reception of a series of fixed blades $m$ the cutting edges of which are situated at the surface of a cylinder and are backed away in the manner usually adopted for machine tools. This annular carrier comprises upper and lower annular plates $n$ and $o$ between which distance pieces $p$ are secured at angular intervals and at said intervals the annular plates $n$ and $o$ are slotted radially at their lower and upper faces respectively to receive the fixed blades $m$. In addition the annular plate $o$ is formed at said intervals with arcuate slots $q$ to establish communication between the inter-blade spaces and the lower part of the base section $a$ and thence to the lateral outlet $b$. In correspondence with the intervals between the distance pieces $p$ the wall of the base section $a$ is formed with openings $r$ which are closed by cover plates $s$ bolted thereto and these cover plates $s$ are suitably apertured to enable a series of set screws $t$, corresponding with the blades $m$, to co-operate therewith for the adjustment of said blades radially of the annular carrier n, o, p. These set screws t are provided with lock nuts u for use after the blades m have been adjusted.

When the disintegrator is being erected the annular carrier n, o, p is inserted downwardly into the base section a, the blades m are afterwards slidden radially into position through the openings r, the cover plates s are applied and the blades m are adjusted by means of the set screws t and locked by the nuts u.

At the lower part of the shaft f is mounted the rotary cutter g having four helical blades v the cutting edges of which are arranged at the surface of a cylinder and said blades being arranged symmetrically about the axis of the cutter (see particularly Figures 2 and 4), the upper ends of said blades being united by a ring w, Figures 1 and 4, which lies within the cylindrical gap in the annular plate n, the outer periphery of said ring w being cylindrical and situated opposite, and close to, the inner periphery of said upper plate n, whilst the inner periphery of said ring w is spaced from the central boss of the cutter g so that apertures are left between said ring and boss and between the helical blades v for the passage of sludge. At its lower end the rotary cutter g has a ring x, which lies within the cylindrical gap in the lower annular plate o, the outer periphery of said ring x being cylindrical and situated opposite, and close to, the inner periphery of said lower plate o. Between the boss of the rotary cutter g and the ring x is a downwardly and outwardly flaring part y which closes the lower ends of the spaces between the helical blades v. In consequence of this arrangement sludge which passes down through the spaces at the top of the rotary cutter g is forced downwardly and outwardly to the apertures q in the lower annular plate o of the carrier n, o, p for the fixed blades m and thence into the base section a of the body and out through the lateral outlet b. It is to be understood that the cutting edges of the fixed and rotary blades m and v are situated at the surfaces of cylinders and that the setting of the fixed blades m relatively to the helical blades v should be varied according to the nature of the sludge to be treated. It is known to provide straight blades at the ends of circumferential slots in a drum which is rotatable relatively to a fixed straight blade for comminuting matter in suspension in a liquid but such an arrangement is only suitable for use when the proportion of liquid to solid is so great that a ready flow will take place and it is not suitable for the disintegration of sewage sludge or like thick matter which must be forced along, e. g. by a rotary cutter arranged as hereinbefore set forth.

The inlet d to the central section c leads to a helical passage 11 open at its bottom towards the spaces between the tops of the helical blades v of the rotary cutter g, this helical passage 11 being of maximum height where it leads from the inlet d and tapering away to nothing after turning through about 300°, as indicated in full and broken lines in Figure 1. The effect of this arrangement is that the sludge or the like is forced gradually downwards to the spaces between the helical blades v as it is carried round the axis of revolution, and in order to set up a preliminary disintegrating action a fixed blade 12, Figures 2 and 3, is adjustably mounted transversely of the helical passage 11, i. e. radially with respect to the shaft f, at that part of said helical passage which is of minimum height, so as to co-operate with the tops of the helical blades v as they pass therebeneath. As shown in Fig. 3, the cutting edge of the blade 12 is at its bottom, such bottom cutting edge being arranged immediately over the cutter structure shown in Fig. 4, the tops of the helical or angular blades v producing a shearing action in cooperation with the blade 12.

This arrangement of the helical passage 11 and the fixed blade 12 is of particular advantage when the sludge or the like to be disintegrated is likely to contain rags, bits of string or like matter which otherwise might be liable to wrap themselves around the boss of the rotary cutter g during the operation of the disintegrator, and, when the machine is idle, fall down on to, and close the spaces between the helical blades v; the formation of the helical passage 11 prevents such aggregation of undesirable matter whilst the co-operation of the fixed blade 12 with the tops of the helical blades v effects a preliminary reduction in size of such matter before it is forced down the spaces between the blades v and is disintegrated by the co-operation of said blades with the fixed blades m.

I claim:

1. A disintegrator for sewage sludge and for like purposes comprising a body having an inlet and an outlet, a cutter rotatably mounted on said body, and a plurality of fixed cutting blades carried by said body, said inlet leading to the top of said rotary cutter by way of an open bottomed helical passage situated over said rotary cutter, the maximum depth of said helical passage being situated at the junction of said inlet with said helical passage, said rotary cutter being constituted by a boss carrying a plurality of helical blades having cutting edges situated at the surface of a cylinder, the parts of said blades between said boss and said cutting edges being directed away from said boss and towards said outlet, and said fixed cutting blades being spaced from one another in a circular series and having cutting edges situated substantially at the surface of the same cylinder as the cutting edges of the blades of the rotary cutter.

2. A disintegrator for sewage sludge and for like purposes comprising a body having an inlet and an outlet, a cutter rotatably mounted on said body, and a plurality of fixed cutting blades carried by said body, said inlet leading to the top of said rotary cutter by way of an open bottomed helical passage situated over said rotary cutter, the maximum depth of said helical passage being situated at the junction of said inlet with said helical passage, said rotary cutter being constituted by a boss carrying a plurality of helical blades having cutting edges situated at the surface of a cylinder, the parts of said blades between said boss and said cutting edges being directed away from said boss and towards said outlet, and said fixed cutting blades being adjustable towards said rotary cutter and spaced from one another in a circular series and having cutting edges situated substantially at the surface of the same cylinder as the cutting edges of the blades of the rotary cutter.

3. A disintegrator for sewage sludge and for like purposes comprising a body having an inlet and an outlet, a cutter rotatably mounted on said body, and a plurality of fixed cutting blades carried by said body, said inlet leading to the top of said rotary cutter by way of an open bottomed helical passage situated over said rotary cutter, the maximum depth of said helical passage being situated at the junction of said inlet with said helical passage, said rotary cutter being constituted by a boss carrying a plurality of helical blades having cutting edges situated at the surface of a cylinder, the parts of said blades between said boss and said cutting edges being directed away from said boss and towards said outlet, and said fixed cutting blades being spaced from one another in a circular series and having cutting edges situated substantially at the surface of the same cylinder as the cutting edges of the blades of the rotary cutter, the blades of the rotary cutter being symmetrically arranged about said boss at such a pitch that each of the blades of the rotary cutter overlaps a plurality of the fixed blades.

4. A disintegrator for sewage sludge and for like purposes comprising a body having an inlet and an outlet, a cutter rotatably mounted on said body, and a plurality of fixed cutting blades carried by said body, said inlet leading to the top of said rotary cutter by way of an open bottomed helical passage situated over said rotary cutter, the maximum depth of said helical passage being situated at the junction of said inlet with said helical passage, said rotary cutter being constituted by a boss carrying a plurality of helical blades having cutting edges situated at the surface of a cylinder, the parts of said blades between said boss and said cutting edges being directed away from said boss and towards said outlet, and said fixed cutting blades being adjustable towards said rotary cutter and spaced from one another in a circular series and having cutting edges situated substantially at the surface of the same cylinder as the cutting edges of the blades of the rotary cutter, the blades of the rotary cutter being symmetrically arranged about said boss at such a pitch that each of the blades of the rotary cutter overlaps a plurality of the fixed blades.

5. A disintegrator for sewage sludge and for like purposes comprising a body having an inlet and an outlet, a cutter rotatably mounted on said body, and a plurality of fixed cutting blades carried by said body, said inlet leading to the top of said rotary cutter by way of an open bottomed helical passage situated over said rotary cutter, the maximum depth of said helical passage being situated at the junction of said inlet with said helical passage, said rotary cutter being constituted by a boss carrying a plurality of helical blades having cutting edges situated at the surface of a cylinder, the parts of said blades between said boss and said cutting edges being directed away from said boss and towards said outlet, and said fixed cutting blades being spaced from one another in a circular series and having cutting edges situated substantially at the surface of the same cylinder as the cutting edges of the blades of the rotary cutter, and a fixed cutting blade arranged transversely of the helical passage at that part thereof which is of minimum depth, said transversely arranged cutting blade having a cutting edge situated immediately above, and in close proximity to, the tops of the helical blades of the rotary cutter.

6. A disintegrator for sewage sludge and for like purposes comprising a body having an inlet and an outlet, a cutter rotatably mounted on said body, and a plurality of fixed cutting blades carried by said body, said rotary cutter being constituted by a boss carrying a plurality of helical blades having cutting edges situated at the surface of a cylinder, the parts of said blades between said boss and said cutting edges being directed away from said boss and towards said outlet, and said fixed cutting blades being spaced from one another in a circular series and having cutting edges situated substantially at the surface of the same cylinder as the cutting edges of the blades of the rotary cutter, and a carrier for said fixed cutting blades, said carrier comprising upper and lower annular plates between which are secured angularly spaced distance pieces, said upper and lower annular plates having faces directed towards one another which are grooved radially and adapted to receive said fixed cutting blades, said lower annular plate being formed with arcuate slots between said distance pieces.

7. A disintegrator for sewage sludge and for like purposes, as claimed in claim 6, wherein the carrier for the fixed cutting blades is housed in a portion of the body having a wall which is apertured at parts thereof corresponding with the spaces between the distance pieces, and wherein there are provided for each of the apertures in said wall a cover plate having set screws arranged to bear at their ends against the outer ends of said fixed cutting blades.

WILLIAM KING PORTEOUS.